United States Patent
Pursifull

(10) Patent No.: US 10,377,205 B2
(45) Date of Patent: Aug. 13, 2019

(54) SYSTEMS AND METHODS FOR COMPRESSOR CLUTCH CONTROL

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 14/801,256

(22) Filed: Jul. 16, 2015

(65) Prior Publication Data

US 2017/0015175 A1     Jan. 19, 2017

(51) Int. Cl.
| | | |
|---|---|---|
| B60H 1/00 | (2006.01) | |
| F16D 48/06 | (2006.01) | |
| B60H 1/32 | (2006.01) | |

(52) U.S. Cl.
CPC ....... B60H 1/00735 (2013.01); B60H 1/0075 (2013.01); B60H 1/3222 (2013.01); F16D 48/064 (2013.01); B60H 2001/325 (2013.01); B60H 2001/3245 (2013.01); B60H 2001/3251 (2013.01); B60H 2001/3261 (2013.01)

(58) Field of Classification Search
CPC ............ B60H 1/00735; B60H 1/00764; B60H 1/3222; B60H 1/3216; B60H 1/3208; B60H 2001/3238; B60H 2001/3266; B60H 2001/3273; F16D 48/064; F25B 2700/15; F25B 2700/151
USPC ........................................ 62/133, 228.1, 230
See application file for complete search history.

(56) References Cited

U.S. PATENT DOCUMENTS

| | | | |
|---|---|---|---|
| 6,226,585 B1 * | 5/2001 | Cullen ................. | B60H 1/3216 701/54 |
| 6,640,563 B2 | 11/2003 | Meckstroth et al. | |
| 8,332,098 B2 | 12/2012 | Major et al. | |
| 2009/0260375 A1 * | 10/2009 | Miyazaki ............. | B60H 1/3208 62/133 |
| 2013/0074537 A1 * | 3/2013 | Rollinger ............. | B60H 1/3216 62/228.1 |

FOREIGN PATENT DOCUMENTS

DE       102011110311 B4    3/2015

OTHER PUBLICATIONS

Ulrey., J. et al., "Methods and Systems for a Vehicle Air Conditioning System," U.S. Appl. No. 14/801,523, filed Jul. 16, 2015, 55 pages.
Pursifull, R. et al., "Fuel Vapor Blocking Valve Control," U.S. Appl. No. 14/730,033, filed Jun. 3, 2015, 28 pages.

* cited by examiner

Primary Examiner — Jianying C Atkisson
Assistant Examiner — Tavia Sullens
(74) Attorney, Agent, or Firm — Julia Voutyras; McCoy Russell LLP

(57) ABSTRACT

Methods and systems are provided for controlling an air conditioning compressor clutch. In one example, a method includes monitoring a clutch of an air conditioning system in a vehicle when the air conditioning system is activated, and responsive to determining that the clutch is not engaged, increasing a current flow to the clutch. In this way, engagement of the compressor clutch may be dynamically maintained with a reduced usage of electrical power.

16 Claims, 9 Drawing Sheets

SYSTEMS AND METHODS FOR COMPRESSOR CLUTCH CONTROL

FIELD

The present description relates generally to methods and systems for controlling a vehicle air conditioning compressor, and more specifically to controlling engagement of an air conditioning compressor clutch.

BACKGROUND/SUMMARY

A typical automotive system includes an engine-driven air conditioning (AC) compressor. The AC compressor compresses refrigerant in an AC system in order to circulate the refrigerant in the system under pressure. To operate the AC compressor, an electromagnetic AC compressor clutch enables the transfer of torque generated by an energy conversion device, such as an engine, to the AC compressor.

When not in use, the AC compressor is de-clutched to reduce engine power draw and to prevent stressing the compressor related componentry. When in use, the AC compressor clutch is engaged. Besides the engine power consumed turning the compressor, this clutch engagement draws a significant amount of electrical power. Presently, a single voltage, typically vehicle voltage, is applied to the electromagnetic clutch to engage the clutch as well as to maintain the engagement.

Other attempts to address control of an AC compressor clutch include applying different electrical power levels to the compressor clutch. One example approach is shown by Major et al. in U.S. Pat. No. 8,332,098. Therein, an AC compressor voltage controller controls the electric power input to a compressor clutch that selectively drives an AC compressor in a vehicle AC system by determining a first electric power level needed to cause the compressor clutch to move to a full engagement position, applying the first electric power level to the compressor clutch to cause the compressor clutch to move to the full engagement position, determining a second electrical power level needed to maintain the compressor clutch in the full engagement position, and applying the second electrical power level to the compressor clutch to maintain the compressor clutch in the full engagement position.

However, the inventors herein have recognized potential issues with such systems. As one example, the second electrical power level applied to the compressor clutch may be more than sufficient for maintaining engagement of the compressor clutch, and so excess electrical power may be used. Conversely, the second electrical power level applied to the compressor clutch may not be sufficient for maintaining engagement of the compressor clutch. Furthermore, in some examples the second electrical power level applied to the compressor clutch may be initially sufficient for maintaining clutch engagement but later may be insufficient for maintaining clutch engagement.

In one example, the issues described above may be addressed by a method for a clutch of an air conditioning system in a vehicle, the method comprising monitoring a clutch of an air conditioning system in a vehicle when the air conditioning system is activated, and responsive to determining that the clutch is not engaged, increasing a current flow to the clutch. In this way, engagement of the compressor clutch may be dynamically maintained with a reduced usage of electrical power.

In another example, the issues described above may be addressed by a method for a clutch of an air conditioning system in a vehicle, the method comprising monitoring refrigerant pressure in the air conditioning system when the air conditioning system is activated, and adjusting voltage applied to a compressor clutch based on the refrigerant pressure. In this way, an operating condition such as refrigerant pressure may be used as feedback to control a compressor clutch. Furthermore, clutch position can be inferred without the use of a sensor dedicated to monitoring the clutch position.

In yet another example, a system comprises an energy conversion device configured to generate torque, a compressor configured to compress refrigerant, a compressor clutch coupled to the energy conversion device and configured to transfer torque from an energy conversion device to the compressor during engagement of the compressor clutch to the compressor, and a controller electrically coupled to the compressor clutch and configured with executable instructions stored in non-transitory memory that when executed cause the controller to: monitor engagement of the compressor clutch, and responsive to disengagement of the compressor clutch when the compressor clutch is commanded to engage, increase a current flow to the compressor clutch. In this way, a compressor clutch may consume an optimal amount of power, and any clutch slippage due to the reduced amount of power consumed by the compressor clutch can be promptly mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
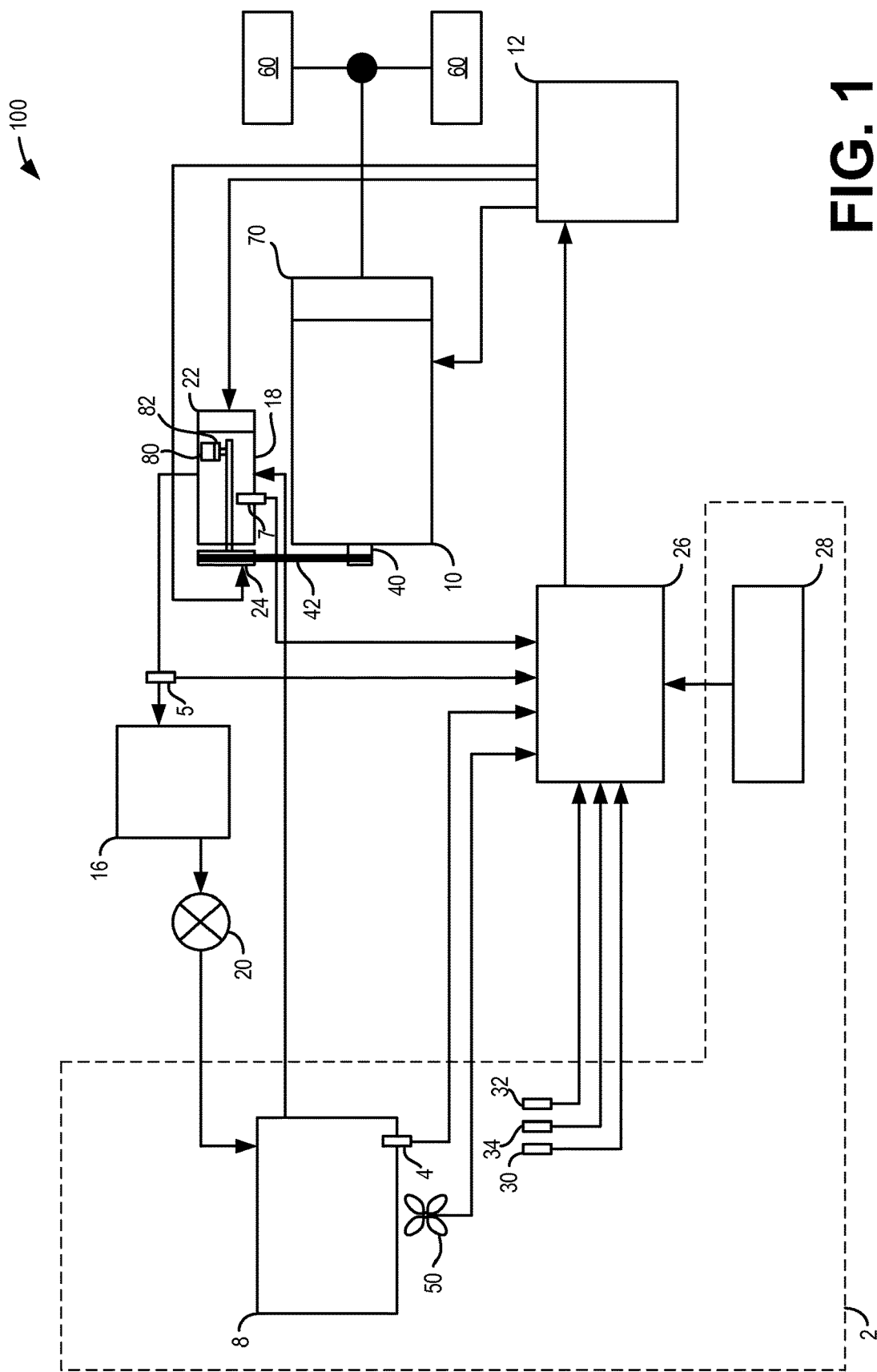
FIG. 1 is a schematic diagram of a vehicle air conditioning system.
Figure 2:
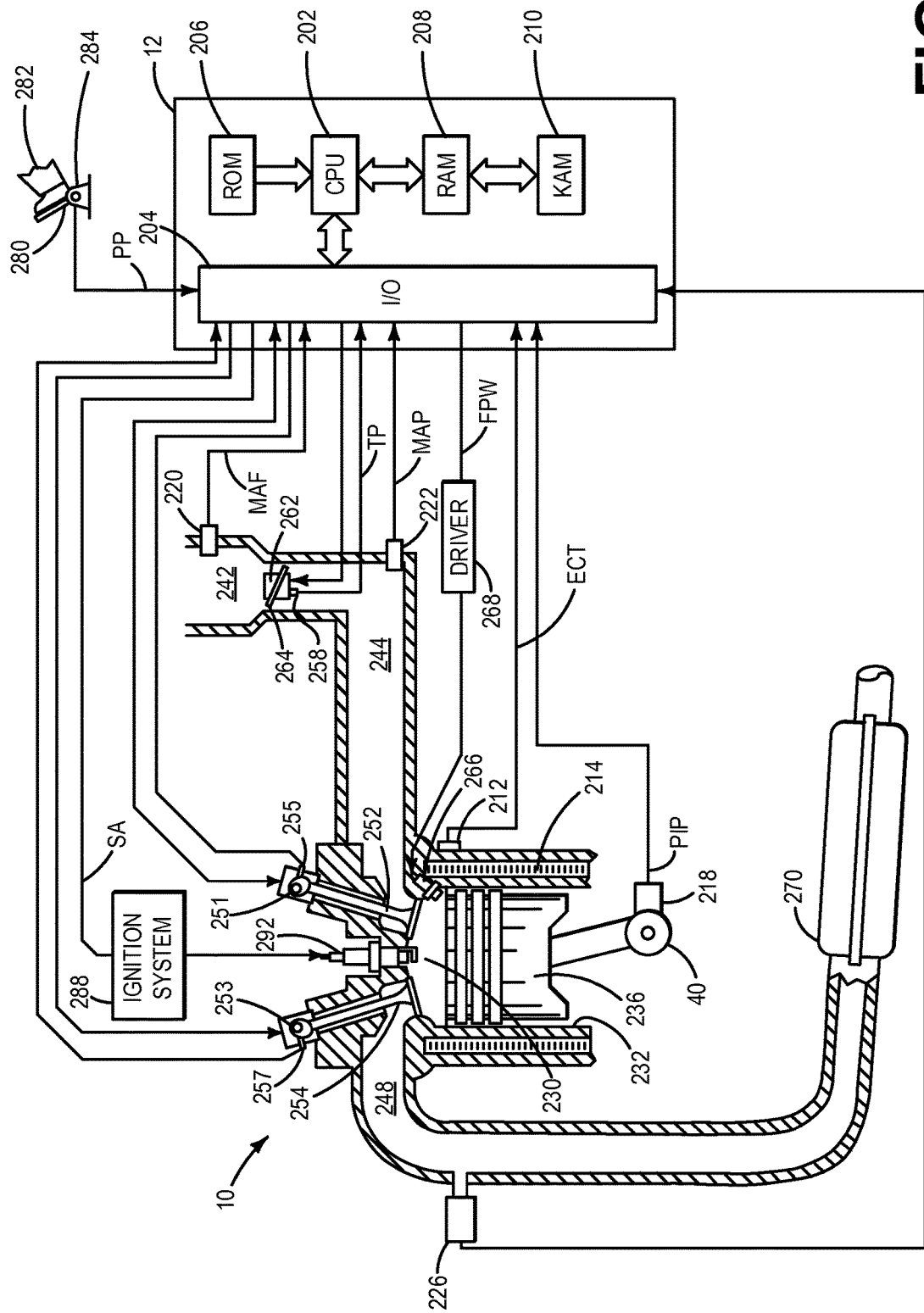
FIG. 2 is a schematic diagram of the energy conversion device of FIG. 1 where the energy conversion device is an engine.
Figure 3:
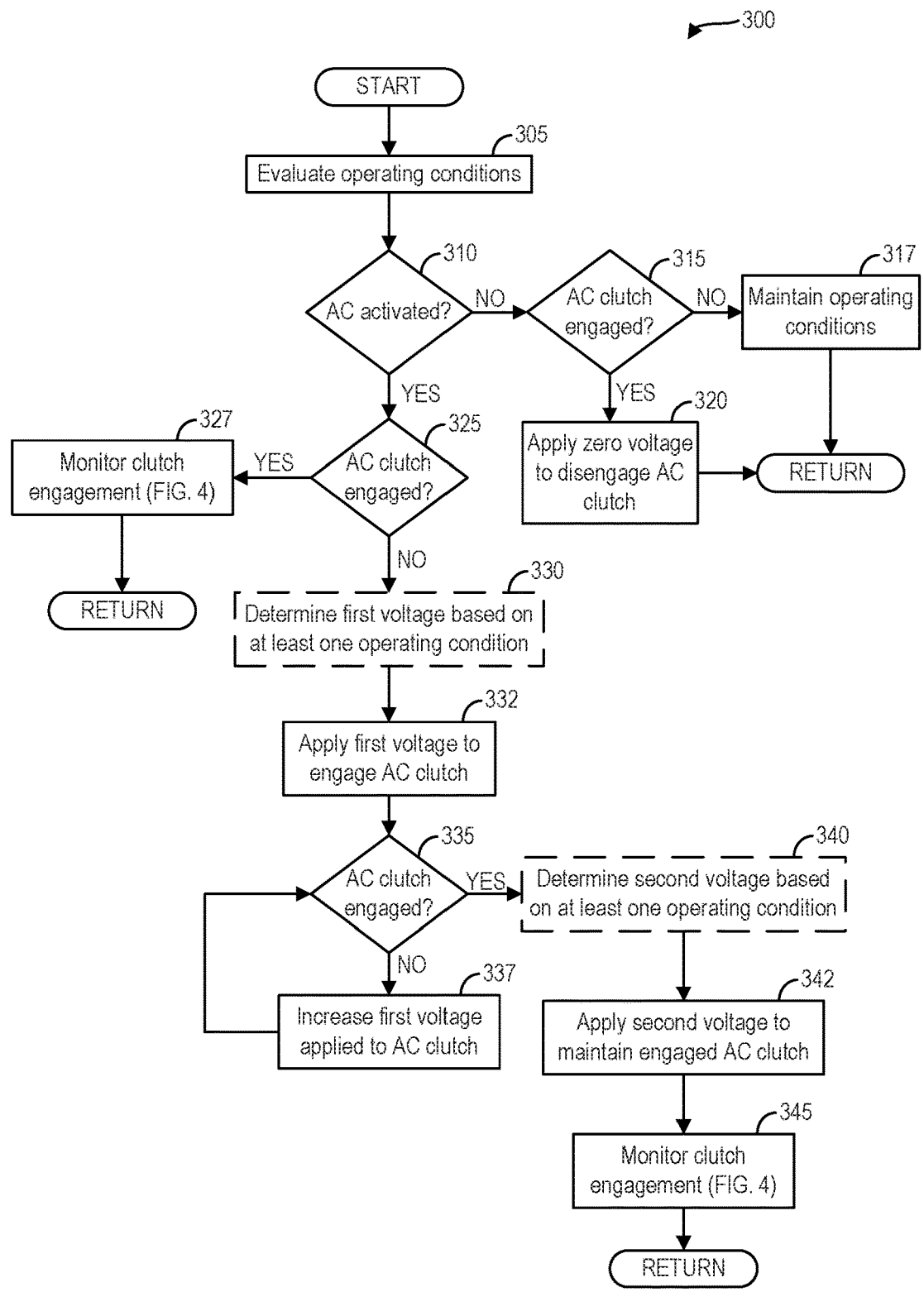
FIG. 3 is a high-level flow chart illustrating an example method for controlling an air conditioning compressor clutch.
Figure 4:
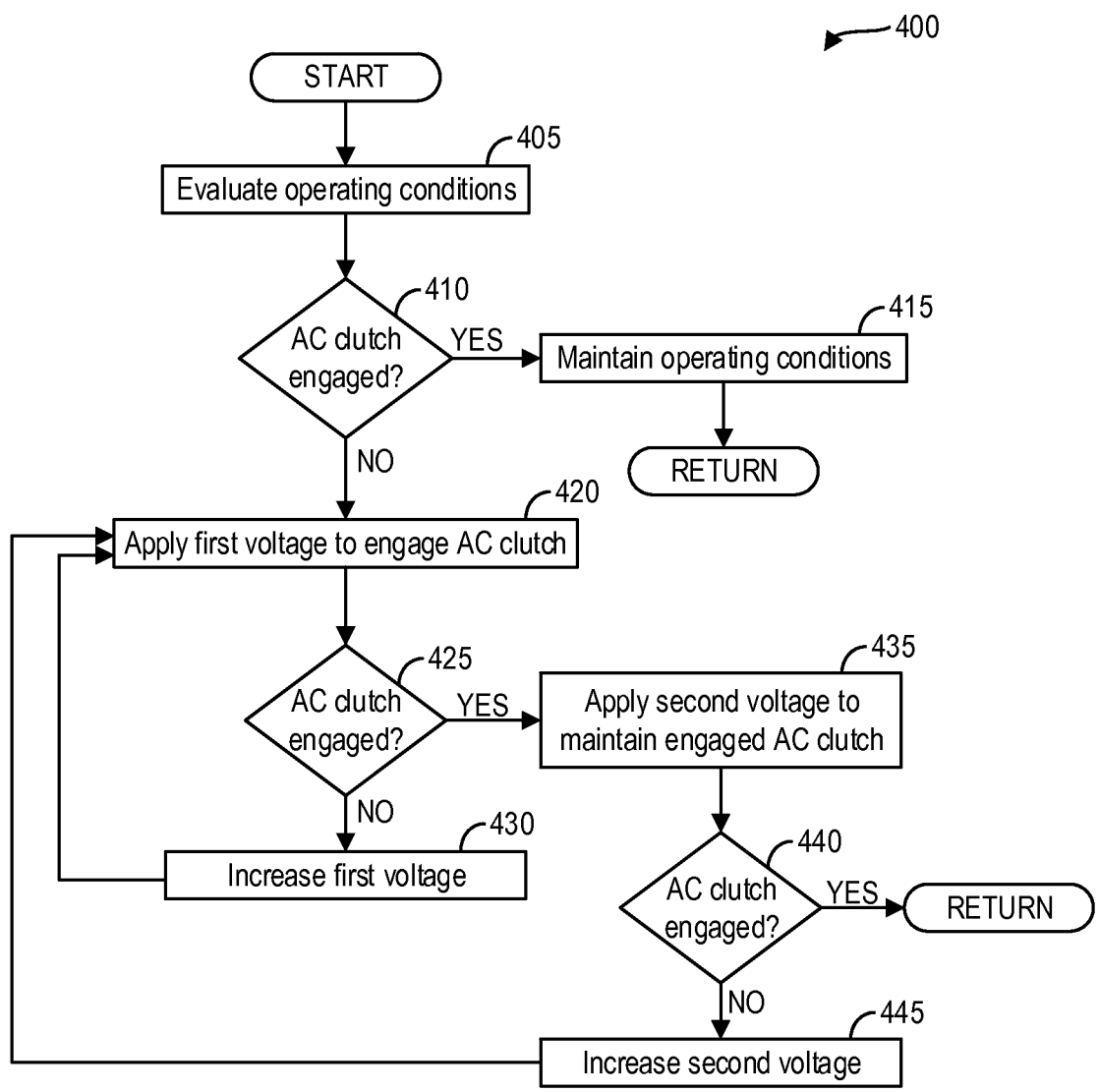
FIG. 4 is a high-level flow chart illustrating an example method for monitoring engagement of an air conditioning compressor clutch.

The following description relates to systems and methods for controlling an air conditioning (AC) system of a vehicle. In particular, systems and methods are provided for controlling an AC compressor clutch. In one non-limiting example, the AC system may be configured as illustrated in FIG. 1. Further, the AC system may be coupled to an engine of a vehicle as illustrated in FIG. 2. The AC system includes an AC compressor clutch which activates and deactivates an AC compressor. A method for controlling an AC compressor clutch includes applying a first voltage to engage the clutch and then applying a second voltage to maintain engagement of the clutch, as shown in FIG. 3. A method for monitoring clutch engagement while the clutch is activated ensures that the clutch is re-engaged upon unintentional disengagement, as shown in FIG. 4. The methods of FIGS. 5-10 provide for determining clutch engagement based on specified operating conditions, including refrigerant pressure, evaporator temperature, engine speed, compressor pressure, and engine torque. Example operating conditions for controlling clutch according to methods described herein shown in FIGS. 11-12.

Referring now to FIG. 1, air conditioning system 100 includes an evaporator 8 for cooling vehicle cabin air. Air is passed over evaporator 8 via fan 50 and directed around vehicle cabin 2. Climate controller 26 operates fan 50 according to operator settings as well as climate sensors. Temperature sensor 4 provides an indication of the temperature of evaporator 8 to climate controller 26. Cabin temperature sensor 30 provides an indication of cabin temperature to climate controller 26. Similarly, humidity sensor 32 provides climate controller 26 an indication of cabin humidity. Sun load sensor 34 provides an indication of cabin heating from sun light to climate controller 26. Climate controller 26 also receives operator inputs from operator interface 28 and supplies desired evaporator temperature and actual evaporator temperature to energy conversion device controller 12.

Operator interface 28 allows an operator to select a desired cabin temperature, fan speed, and distribution path for conditioned cabin air. Operator interface 28 may include dials and push buttons to select air conditioning settings. In some examples, operator interface 28 may accept inputs via a touch sensitive display.

Refrigerant is supplied to evaporator 8 via evaporator valve 20 after being pumped into condenser 16. Compressor 18 receives refrigerant gas from evaporator 8 and pressurizes the refrigerant. Heat is extracted from the pressurized refrigerant so that the refrigerant is liquefied at condenser 16. The liquefied refrigerant expands after passing through evaporator valve 20 causing the temperature of evaporator 8 to be reduced.

Compressor 18 includes a clutch 24, a displacement control valve 22, piston 80, and swash plate 82. Piston 80 pressurizes refrigerant in air conditioning system 100 which flows from air conditioner compressor 18 to condenser 16. Swash plate 82 adjusts the stroke of piston 80 to adjust the pressure at which refrigerant is output from air conditioner compressor 18 based on oil flow through variable displacement control valve 22. Clutch 24 may be selectively engaged and disengaged to supply air conditioner compressor 18 with rotational energy from energy conversion device 10. In one example, energy conversion device 10 is an engine supplying rotational energy to compressor 18 and wheels 60 via transmission 70. Rotational energy may be supplied to air conditioner compressor 18 from energy conversion device 10 via belt 42. In one example, belt 42 mechanically couples shaft 40 to air conditioner compressor 18 via clutch 24. Shaft 40 may be an engine crankshaft, or other shaft.

In this way, the system of FIG. 1 provides rotational energy to an air conditioner compressor to cool the cabin of a vehicle. Specifically, the air conditioner compressor provides a negative torque to load the energy conversion device and compress the refrigerant so that the refrigerant can be subsequently expanded in order to cool the vehicle cabin. The amount of negative torque provided to the energy conversion device by the air conditioner compressor can be adjusted via the clutch and an actuator or valve that adjusts the variable displacement pump.

The controller 12 and/or the climate controller 26 receives signals from the various sensors of FIG. 1 and employs the various actuators of FIG. 1 to adjust system operation based on the received signals and instructions stored on a memory of the controller. In one example, the controller 12 and/or the climate controller 26 may receive signals from a pressure sensor 5 and may employ various actuators to adjust control of the clutch 24 based on the received signals. For example, air conditioning system 100 may include a pressure sensor 5 coupled between the evaporator 8 and the condenser 16 and configured to sense refrigerant pressure as refrigerant moves from the condenser 16 to the evaporator 8. As depicted, the pressure sensor 5 may be positioned upstream from the evaporator valve 20. In alternate examples, the pressure sensor 5 may be positioned downstream from the evaporator valve 20. As depicted, the pressure sensor 5 may provide a sensed refrigerant pressure to climate controller 26. It will be appreciated that in some examples, the pressure sensor 5 may provide the sensed refrigerant pressure to the energy conversion device controller 12. In yet other examples, the pressure sensor 5 may provide the sensed refrigerant pressure to climate controller 26, which in turn may communicate the sensed refrigerant pressure to the energy conversion device controller 12. The climate controller 26 and/or the energy conversion device controller 12 may adjust control of the clutch 24 based on the sensed refrigerant pressure. In particular, as described further herein with regard to FIG. 5, a method for determining if the compressor clutch 24 is engaged may include determining if refrigerant pressure, as sensed by pressure sensor 5, is increasing and/or above a pressure threshold. For example, if the pressure sensor 5 indicates a high or an increasing refrigerant pressure, then the clutch 24 is engaged.

In another example, the controller 12 and/or the climate controller 26 may receive signals from a pressure sensor 7 and may adjust control of the clutch 24 based on the received signals. For example, air conditioning system 100 may include pressure sensor 7 coupled to the compressor 18 and configured to sense pressure of refrigerant within the compressor 18 (hereinafter referred to as compression chamber pressure). As depicted, the pressure sensor 7 may provide sensed compressor pressure to the climate controller 26. Alternatively, the pressure sensor 7 may provide the sensed compressor pressure to the energy conversion device controller 12. In another example, the pressure sensor 7 may provide the sensed compressor pressure to the climate controller 26, which in turn may communicate the sensed compressor pressure to the energy conversion device controller 12. The climate controller 26 and/or the energy conversion device controller 12 may adjust control of the clutch 24 based on the sensed compressor pressure. Pressure sensor 7, while located in the compressor chamber, can directly sense compressor inlet pressure and compressor outlet pressure. Specifically, the compressor inlet pressure may be determined based on pressure indications from pressure sensor 7 during an intake stroke of piston 80, while the compressor outlet pressure may be determined based on pressure indications from pressure sensor 7 during a discharge stroke of piston 80. In one example, as described further herein with regard to FIG. 9, a method for determining if the compressor clutch 24 is engaged may include determining if compressor pressure, as measured by pressure sensor 7, is pulsating. For example, if the compressor pressure is pulsating, then the clutch 24 is engaged. The compression chamber sensor 7 may be upstream of the compressor outlet check valves. The compressor outlet pressure is downstream of these same check valves. Both signals pulsate: the compression chamber pressure signal pulsates over a large amplitude and the compressor outlet pressure pulsates with a low amplitude. In some examples, compressor speed may be determined from pressure indications received from pressure sensor 7, and clutch state may be inferred based on the compressor speed. However, the methods described herein for determining clutch engagement, at least in some examples, only rely on compressor pressure and do not consider compressor speed.

Referring now to FIG. 2, one example of an energy conversion device is shown. In particular, energy conversion device 10 is an internal combustion engine, comprising a plurality of cylinders, one cylinder of which is shown in FIG. 2, is controlled by electronic energy conversion device controller 12. Engine 10 includes combustion chamber 230 and cylinder walls 232 with piston 236 positioned therein and connected to shaft 40 which is a crankshaft. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. Alternatively, one or more of the intake and exhaust valves may be operated by an electromechanically controlled valve coil and armature assembly. The position of intake cam 251 may be determined by intake cam sensor 255. The position of exhaust cam 253 may be determined by exhaust cam sensor 257.

Fuel injector 266 is shown positioned to inject fuel directly into cylinder 230, which is known to those skilled in the art as direct injection. Alternatively, fuel may be injected to an intake port, which is known to those skilled in the art as port injection. Fuel injector 266 delivers liquid fuel in proportion to the pulse width of signal FPW from energy conversion device controller 12. Fuel is delivered to fuel injector 266 by a fuel system (not shown) including a fuel tank, fuel pump, and fuel rail (not shown). Fuel injector 266 is supplied operating current from driver 268 which responds to energy conversion device controller 12. In addition, intake manifold 244 is shown communicating with optional electronic throttle 262 which adjusts a position of throttle plate 264 to control air flow from air intake 242 to intake manifold 244. In one example, a low pressure direct injection system may be used, where fuel pressure can be raised to approximately 20-30 bar. Alternatively, a high pressure, dual stage, fuel system may be used to generate higher fuel pressures.

Distributorless ignition system 288 provides an ignition spark to combustion chamber 230 via spark plug 292 in response to energy conversion device controller 12. Universal Exhaust Gas Oxygen (UEGO) sensor 266 is shown coupled to exhaust manifold 248 upstream of catalytic convertor 270. Alternatively, a two-state exhaust gas oxygen sensor may be substituted for UEGO sensor 226.

Convertor 270 can include multiple catalyst bricks, in one example. In another example, multiple emission control devices, each with multiple bricks, can be used. Convertor 270 can be a three-way type catalyst in one example.

Energy conversion device controller 12 is shown in FIG. 2 as a conventional microcomputer including: microprocessor unit 202, input/output ports 204, read-only memory 206, random access memory 208, keep alive memory 210, and a conventional data bus. Energy conversion device controller 12 is shown receiving various signals from sensors coupled to energy conversion device 10, in addition to those signals previously discussed, including: engine coolant temperature (ECT) from temperature sensor 212 coupled to cooling sleeve 214; a position sensor 284 coupled to an accelerator pedal 280 for sensing force applied by foot 282; a measurement of engine manifold pressure (MAP) from pressure sensor 222 coupled to intake manifold 244; an engine position sensor from a Hall effect sensor 218 sensing position of shaft 40; a measurement of air mass entering the engine from sensor 220; and a measurement of throttle position from sensor 258. Barometric pressure may also be sensed (sensor not shown) for processing by energy conversion device controller 12. In a preferred aspect of the present description, engine position sensor 218 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variations or combinations thereof. Further, in some embodiments, other engine configurations may be employed, for example a diesel engine.

During operation, each cylinder within the engine typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g., when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g., when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion. During the expansion stroke, the expanding gases push piston 236 back to BDC. Shaft 40 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing times may vary, such as to provide positive or negative valve overlap, late intake valve closing, or various other examples.

FIG. 3 shows a high-level flow chart illustrating an example method 300 for controlling an air conditioning (AC) compressor clutch according to an embodiment of the disclosure. In particular, method 300 relates to initially engaging a compressor clutch, such as the clutch 24 of air conditioning system 100 depicted in FIG. 1, via a first control voltage and maintaining engagement of the compressor clutch via a second control voltage, wherein the first control voltage is greater than the second control voltage. Method 300 will be described herein with reference to the components and systems depicted in FIGS. 1-2, though it should be understood that the method may be applied to other systems without departing from the scope of this disclosure. Instructions for carrying out method 300 and the rest of the methods included herein may be executed by a controller based on instructions stored on a memory of the controller and in conjunction with signals received from sensors of the air conditioning system and the engine system, such as the sensors described above with reference to FIGS. 1-2. The controller may employ actuators of the air conditioning system and the engine system to adjust operation of the air conditioning system and/or the engine system, according to the methods described below.

Method 300 begins at 305. At 305, method 300 includes evaluating operating conditions. Operating conditions include, but are not limited to, air conditioning system status, engine speed, refrigerant pressure, compressor clutch coil temperature, cabin temperature, engine torque, and so on. Operating conditions may be measured by one or more sensors coupled to the controller, or may be estimated or inferred based on the available data. After evaluating operating conditions, method 300 proceeds to 310.

At 310, method 300 includes determining if an air conditioning compression request is active. In other words, this means that the AC system has determined that the AC compression needs to restore compressor outlet pressure for the HVAC goals to be met. Determining if the HVAC system is calling for AC compression may comprise determining an air conditioning system status. The air conditioning compression request status may comprise a binary value of on (i.e., activated) and off (i.e., not activated). If the operator commands the air conditioning system to be on, for example via the operator interface 28, then the air conditioning system may call for AC compression. Similarly, if the operator commands the air conditioning system off, then the air conditioning system status is not activated, or off. If the AC compression request is active, then the AC clutch should be engaged. If the AC compression request is not active, then the AC clutch should not be engaged.

In some examples, determining if the AC compression request is active further includes determining if cooling is desired while the air conditioning system status is on. For example, the air conditioning system may be on and commanded to produce a specified cabin temperature. When the cabin temperature reaches the specified cabin temperature, the AC may be on but compression request is not activated. Thus, the AC may be only be activated while the AC system status is on, however the AC may also be deactivated while the AC system is on. If the commanded cabin temperature differs from the measured cabin temperature, then the AC is activated to bring the difference between commanded and measured cabin temperature to zero. To put it in common parlance, if one needs the evaporator to be colder, one opens the throttle valve 20. To make opening throttle valve 20 have any value, one provides a pressure difference across it. Engaging the clutch and turning on the compressor raises the compressor outlet pressure and thus the condenser pressure. Many systems do not include a position-able throttle valve 20 and simply rely on controlling compressor engagement to value flow through valve 20.

Referring again to FIG. 3, if the AC compression request is not active ("NO"), method 300 proceeds to 315. At 315, method 300 includes determining if the AC compressor clutch is engaged. In some examples, a current engagement status of the AC compressor clutch (e.g., engaged or not engaged) may be stored in memory, such that determining if the AC compressor clutch is engaged comprises referencing the stored engagement status of the AC compressor clutch. In other examples, engagement of the AC compressor clutch may be monitored in real-time based on one or more evaluated operating conditions. Example methods for determining engagement of the AC compressor clutch are described further herein and with regard to FIGS. 5-10.

If the AC compressor clutch is not engaged ("NO"), method 300 proceeds to 317. At 317, method 300 includes maintaining operating conditions, such as the operating conditions evaluated at 305. Method 300 may then end.

However, returning to 315, if the AC clutch is engaged ("YES"), then method 300 proceeds to 320. At 320, method 300 includes disengaging the AC compressor clutch by applying a zero voltage to the compressor clutch. Method 300 may then end.

Returning to 310, if the AC is activated ("YES"), method 300 proceeds to 325. At 325, method 300 includes determining if the AC compressor clutch is engaged. If the AC compressor clutch is engaged ("YES"), then method 300 proceeds to 327. At 327, method 300 includes monitoring clutch engagement. Engagement of the compressor clutch may be continuously monitored while the AC is activated to ensure that the compressor clutch may be re-engaged upon unintentional disengagement. An example method for monitoring clutch engagement, described further herein and with regard to FIG. 4, may therefore include determining if the compressor clutch is engaged, and responsive to the compressor clutch not engaged, re-engaging the compressor clutch. Method 300 may then end.

However, if the AC compressor clutch is not engaged ("NO") at 325, method 300 proceeds to 330. At 330, method 300 may optionally include determining a first voltage based on at least one operating condition. The first voltage comprises a clutch engagement voltage which, when applied to the clutch in an un-engaged state, energizes the clutch such that the clutch engages. For example, the first voltage may be calculated based on a clutch coil resistance or temperature. Since the coil resistance increases as a function of temperature, a same voltage applied at a higher temperature and a lower temperature will produce less current at the higher temperature than at the lower temperature. Therefore, in order to apply a particular current to the clutch coil and thereby electromagnetically actuate and engage the clutch, a higher voltage may be applied at higher temperatures while a lower voltage may be applied at lower temperatures. The particular voltage applied may depend on the clutch coil resistance, which may be inferred by current feedback or sensed temperature of the clutch coil. Thus, in one example, determining the first voltage may comprise evaluating a clutch coil temperature and obtaining a voltage corresponding to the clutch coil temperature in a lookup table, where the lookup table comprises a table of clutch coil temperatures and corresponding voltages for obtaining a particular current in the clutch coil. In some examples, the operating condition used to determine the first voltage may comprise, as a non-limiting example, refrigerant pressure.

Continuing at 332, method 300 includes engaging the AC compressor clutch by applying a first voltage to the AC compressor clutch. In examples where the optional action 330 is performed, the first voltage applied to the AC compressor clutch may comprise the first voltage determined at 330. In this way, the first voltage may comprise a minimum voltage capable of engaging the AC compressor clutch based on instantaneous operating conditions. In examples wherein the optional action 330 is not performed, the first voltage may comprise a pre-determined voltage capable of enabling engagement of the compressor clutch regardless of operating conditions.

Optionally, the control module may look at the inductive signature caused by solenoid movement to verify that the clutch moved. Additionally or alternatively, the inductive signature may be used to indicate the timing to transition to the lower holding voltage/current/power.

At 335, method 300 includes determining if the AC compressor clutch is engaged. If the AC compressor clutch is engaged ("YES"), then method 300 proceeds to 340. However, if the AC compressor clutch is not engaged ("NO"), then the first voltage applied to the AC compressor clutch is insufficient for initially engaging the AC compressor clutch. Method 300 then proceeds to 337. At 337, the voltage applied to the AC compressor clutch (i.e., the first voltage applied at 330) is increased. After increasing the first voltage applied to the AC compressor clutch, method 300 returns to 335, wherein the method includes determining if the AC compressor clutch is engaged. The loop between 335 and 337 continues, with the voltage applied to the AC compressor clutch increasing by a predetermined amount at each iteration, until the AC clutch is engaged ("YES"). In this way, the minimum voltage necessary to initially engage the AC compressor clutch may be applied to the AC compressor clutch. Method 300 then proceeds to 340.

The algorithm as described can only increase pull-in or hold electrical voltage/current/power/energy; however, the method to start at a low nominal and add anticipates a control system that would start at a nominal voltage/current/power/energy and either add or subtract.

At 340, method 300 may optionally include determining a second voltage based on at least one operating condition. The second voltage applied to the AC compressor clutch may be based on one or more operating conditions. For example, as discussed above, the second voltage may be calculated based on a clutch coil resistance or temperature. Since the coil resistance increases as a function of temperature, a same voltage applied at a higher temperature and a lower temperature will produce less current at the higher temperature than at the lower temperature. Therefore, in order to apply a particular current to the clutch coil and thereby electromagnetically maintain engagement of the clutch, a higher voltage may be applied at higher temperatures while a lower voltage may be applied at lower temperatures. The particular voltage applied may depend on the clutch coil resistance, which may be inferred by current feedback or sensed temperature of the clutch coil. Thus, in one example, determining the second voltage may comprise evaluating a clutch coil temperature and obtaining a voltage corresponding to the clutch coil temperature in a lookup table, where the lookup table comprises a table of clutch coil temperatures and corresponding voltages for obtaining a desired holding current in the clutch coil. The desired holding current comprises the current that maintains engagement of the clutch. In some examples, the desired holding current may be determined based on one or more operating conditions. For example, the holding current may be determined based on compressor torque requirements, which is proportional to compressor pressure.

Continuing at 342, method 300 includes applying the second voltage to the AC compressor clutch to maintain engagement of the AC compressor clutch. If the optional action 340 is performed, then the second voltage determined based on at least one operating condition may be applied to the AC compressor clutch. In examples wherein the optional action 340 is not performed, the second voltage may comprise a minimum voltage capable of maintaining engagement of the compressor clutch during typical operating conditions. In all examples, the second voltage for maintaining engagement is smaller than the first voltage for initially engaging the compressor clutch. In this way, the power drawn while maintaining the compressor clutch may be minimized.

After applying the second voltage to maintain engagement of the compressor clutch, method 300 proceeds to 345. At 345, method 300 includes monitoring clutch engagement. Monitoring clutch engagement includes determining if the compressor clutch is engaged, and responsive to the compressor clutch not engaged, re-engaging the compressor clutch. A method for monitoring clutch engagement is described further herein with regard to FIG. 4. Method 300 may then end.

Thus, a method for controlling an air conditioning compressor clutch includes applying a first voltage to the compressor clutch to enable engagement of the compressor clutch, and applying a second voltage to the compressor clutch to maintain engagement of the compressor clutch, wherein the second voltage is smaller than the first voltage. In some examples, the first voltage and/or the second voltage may be determined based on one or more operating conditions. Furthermore, engagement of the compressor clutch may be monitored after the compressor clutch is engaged. As described further herein with regard to FIG. 4, a method for monitoring engagement of the compressor clutch may include determining if the compressor clutch is still engaged, and re-engaging the compressor clutch responsive to the compressor clutch not being engaged.

FIG. 4 shows a high-level flow chart illustrating an example method 400 for monitoring engagement of an AC compressor clutch according to an embodiment of the disclosure. In particular, method 400 relates to maintaining engagement of the AC compressor clutch while the AC is activated. Method 400 may comprise a subroutine of method 300. In particular, method 400 may comprise actions 327 and 345 of method 300, or monitoring and maintaining clutch engagement. Method 400 will be described herein with reference to the components and systems of FIGS. 1-2, though it should be understood that the method may be applied to other components and systems without departing from the scope of this disclosure.

Method 400 begins at 405. At 405, method 400 includes evaluating operating conditions. Operating conditions may include, but are not limited to, air conditioning system status, engine speed, evaporator temperature, compressor pressure, compressor clutch coil temperature, refrigerant pressure, engine load, and so on. Operating conditions may be measured by one or more sensors coupled to the controller, or may be estimated or inferred based on the available data.

At 410, method 400 includes determining if the AC compressor clutch is engaged. Since method 400 comprises a subroutine of monitoring clutch engagement (e.g., actions 327 and/or 345 of method 300), the AC compressor clutch is expected to be engaged. Therefore, if the AC compressor clutch is engaged ("YES"), then method 400 proceeds to 415. At 415, method 400 includes maintaining operating conditions, such as the operating conditions evaluated at 405. Method 400 may then end.

Returning to 410, if the AC compressor clutch is not engaged ("NO"), then method 400 proceeds to 420. At 420, method 400 includes applying a first voltage to engage the AC compressor clutch.

At 425, method 400 includes determining if the AC compressor clutch is engaged. If the AC compressor clutch is not engaged ("NO"), then method 400 proceeds to 430. At 430, method 400 includes increasing the first voltage by a specified amount. For example, the first voltage applied to the compressor clutch may initially be At 435, method 400 includes applying a second voltage to maintain engagement of the AC compressor clutch. In some examples, the second voltage applied to the compressor clutch may comprise the second voltage determined at 340 in method 300, as described herein above with regard to FIG. 3. In other examples, the second voltage may comprise a default voltage.

The two voltage levels (pull-in and hold) are the result of summing the initial voltage and the voltage increments. This value is reset at each vehicle key-up cycle. Alternatively, it may reset after a long period of non-use, e.g. 6 hours.

Continuing at 440, method 400 includes determining if the AC compressor clutch is engaged. If the AC compressor clutch is engaged ("YES"), method 400 may then return.

However, if the AC compressor clutch is not engaged at 440, method 400 proceeds to 445. Since the second voltage applied at 435 is insufficient for maintaining engagement of the AC compressor clutch, at 445, method 400 includes increasing the second voltage. Method 400 then returns to 420, wherein the first voltage is applied to the compressor clutch to re-engage the compressor clutch. The loop between 420 and 435 continues, with the second voltage applied to the AC compressor clutch increasing at each iteration at 445, until the AC compressor clutch is engaged ("YES") when applying the second voltage to the compressor clutch. When engagement of the AC compressor clutch is maintained by the second voltage ("YES" at 440), method 400 may then end.

Thus, a method for monitoring an engaged compressor clutch may include determining if the compressor clutch is engaged, and re-engaging the compressor clutch responsive to the compressor clutch not being engaged. Determining if the compressor clutch is engaged may be based on one or more operating conditions. Methods for determining if the compressor clutch is engaged based on different operating conditions are described further herein and with regard to FIGS. 5-10. Each of the methods described herein below with regard to FIGS. 5-10 may comprise a subroutine of methods 300 and/or 400 described herein above with regard to FIGS. 3-4. In particular, one or more of the methods described herein below may comprise determining if the AC clutch is engaged at one or more actions 315, 325, 335, 410, 425, and 440.

Figure 5:
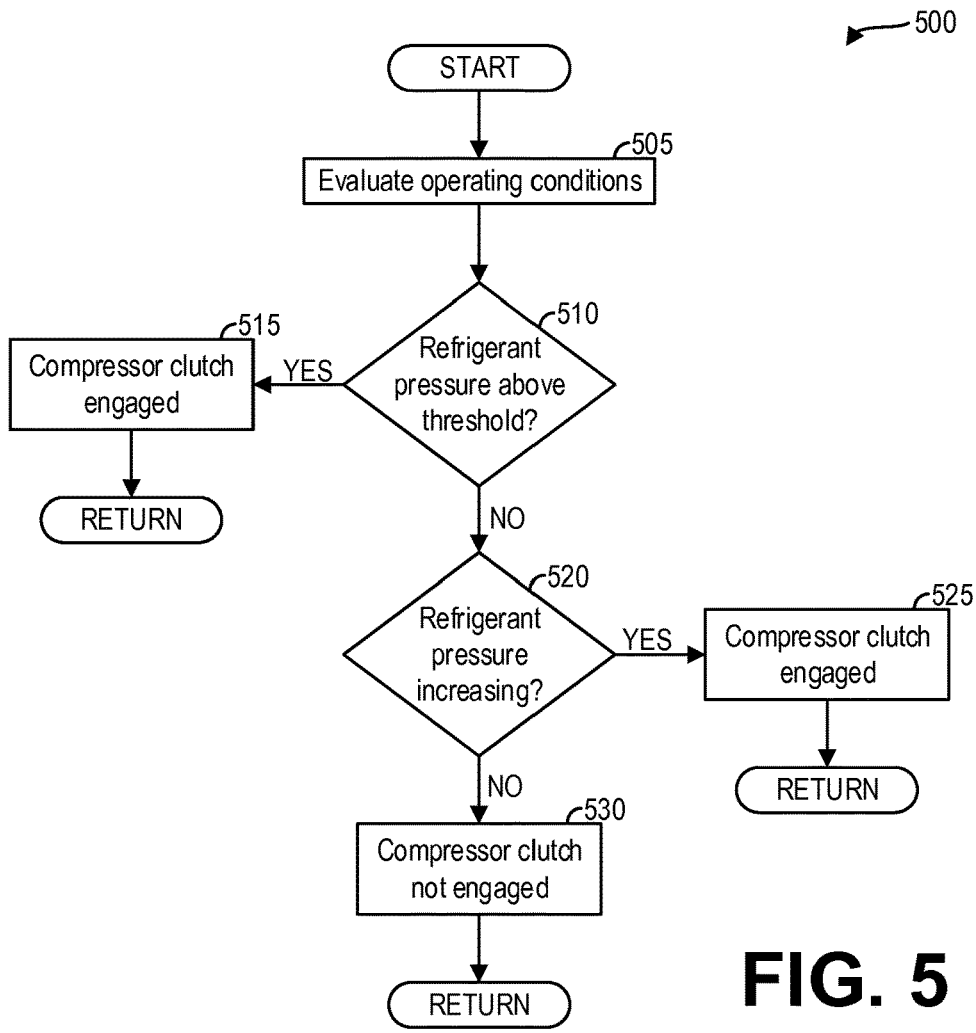
FIG. 5 is a high-level flow chart illustrating an example method for determining engagement of an air conditioning compressor clutch based on refrigerant pressure.

FIG. 5 shows a high-level flow chart illustrating an example method 500 for determining engagement of an AC compressor clutch according to an embodiment of the disclosure. In particular, method 500 relates to determining engagement of an AC compressor clutch based on sensed refrigerant pressure. Method 500 will be described herein with reference to the components and systems of FIGS. 1-2, however it should be understood that the method may be applied to other components and systems without departing from the scope of this disclosure.

Method 500 begins at 505. At 505, method 500 includes evaluating operating conditions. Operating conditions may be measured by one or more sensors coupled to the controller, or may be estimated or inferred based on the available data.

At 510, method 500 includes determining if the refrigerant pressure is above a threshold. If the refrigerant pressure is above the threshold ("YES"), then method 500 proceeds to 515. At 515, the method concludes that the compressor clutch is engaged. The method then returns. However, if the refrigerant pressure is not above the threshold ("NO"), then method 500 proceeds to 520.

At 520, method 500 includes determining if the refrigerant pressure is increasing. If the refrigerant pressure is increasing ("YES"), method 500 proceeds to 525. At 525, the method concludes that the compressor clutch is engaged. The method then returns.

However, if the refrigerant pressure is not increasing ("NO") at 520, method 500 proceeds to 530. At 530, the method concludes that the compressor clutch is not engaged. The method then returns.

Thus, engagement of the compressor clutch may be determined based on refrigerant pressure, and a method for determining engagement of the compressor clutch may include determining if refrigerant pressure is increasing and/or above a pressure threshold.

Figure 6:
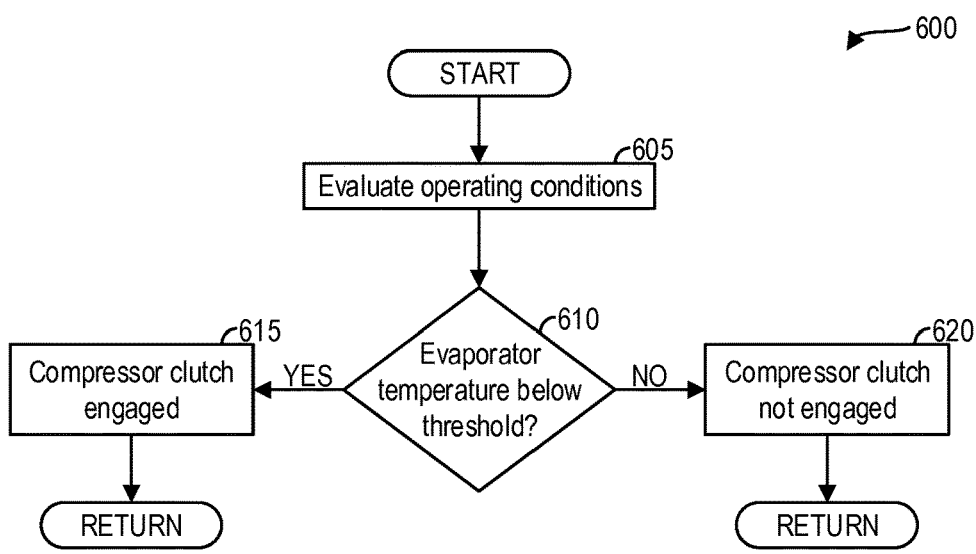
FIG. 6 is a high-level flow chart illustrating an example method for determining engagement of an air conditioning compressor clutch based on evaporator temperature.

FIG. 6 shows a high-level flow chart illustrating an example method 600 for determining engagement of an AC compressor clutch according to an embodiment of the disclosure. In particular, method 600 relates to determining engagement of an AC compressor clutch based on sensed evaporator temperature. Method 600 will be described herein with reference to the components and systems of FIGS. 1-2, however it should be understood that the method may be applied to other components and systems without departing from the scope of this disclosure.

Method 600 begins at 605. At 605, method 600 includes evaluating operating conditions. Operating conditions may be measured by one or more sensors coupled to the controller, or may be estimated or inferred based on the available data.

At 610, method 600 includes determining if the evaporator temperature is below a threshold. If the evaporator temperature is below the threshold, then the compressor may be engaged. In some examples, the threshold may be selected based on an ambient temperature external to the vehicle. In this way, ambient temperatures may not interfere with the method. The evaporator temperature may be measured, as an example, by temperature sensor 4 described herein above with regard to FIG. 1.

If the evaporator temperature is below the threshold ("YES"), method 600 proceeds to 615. At 615, the method concludes that the compressor clutch is engaged. The method returns.

If the evaporator temperature is above the threshold ("NO"), method 600 proceeds to 620. At 620, the method concludes that the compressor clutch is not engaged. The method returns.

Thus, engagement of the compressor clutch may be determined based on evaporator temperature, and a method for determining engagement of the compressor clutch includes determining whether or not the evaporator temperature is below a threshold.

Figure 7:
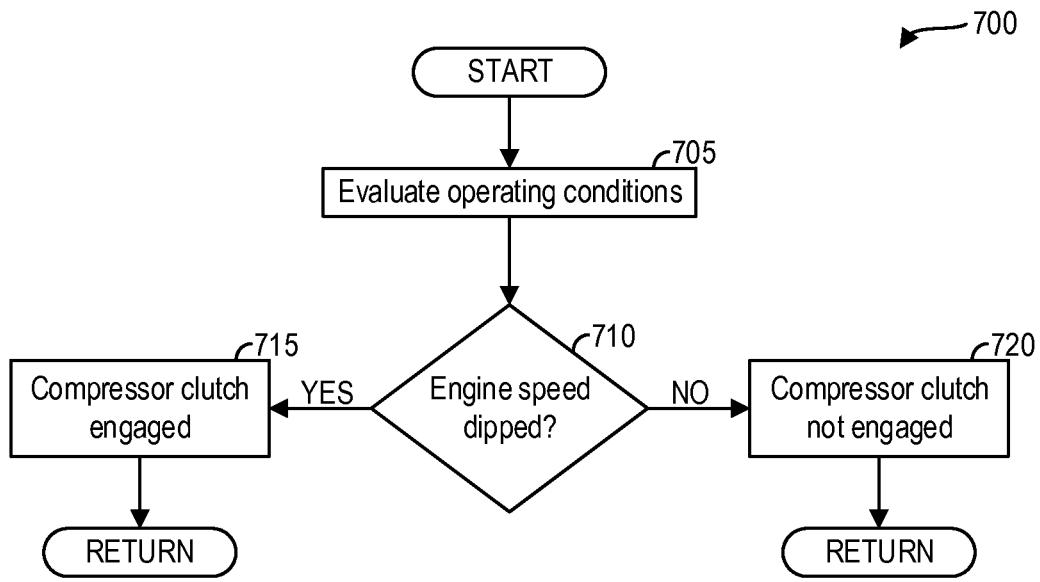
FIG. 7 is a high-level flow chart illustrating an example method for determining initial engagement of an air conditioning compressor clutch based on engine speed.

FIG. 7 shows a high-level flow chart illustrating an example method 700 for determining engagement of an AC compressor clutch according to an embodiment of the disclosure. In particular, method 700 relates to determining engagement of an AC compressor clutch based on a dip in engine speed during engagement of the AC compressor clutch. Method 700 will be described herein with reference to the components and systems of FIGS. 1-2, however it should be understood that the method may be applied to other components and systems without departing from the scope of this disclosure.

Method 700 begins at 705. At 705, method 700 includes evaluating operating conditions. Operating conditions may be measured by one or more sensors coupled to the controller, or may be estimated or inferred based on the available data.

At 710, method 700 includes determining if the engine speed dipped. A dip in the engine speed comprises a sudden decrease in engine speed. Thus, determining if the engine speed dipped may comprise sensing a decrease in engine speed wherein the rate of change in engine speed is above a threshold rate for a specified time duration. The threshold rate and the specified time duration may be selected to exclude small fluctuations in engine speed. Furthermore, the threshold rate and the specified time duration may additionally or alternatively selected to exclude dips in engine speed caused by changes in operating conditions other than engagement or disengagement of the compressor clutch.

If the engine speed dipped ("YES"), then method 700 proceeds to 715. At 715, the method concludes that the compressor clutch is engaged. The method returns.

If the engine speed did not dip ("NO"), then method 700 proceeds from 710 to 720. At 720, the method concludes that the compressor clutch is not engaged. The method returns.

Thus, engagement of the compressor clutch may be determined based on a dip in engine speed, and a method for determining engagement of the compressor clutch may include determining if such a dip in engine speed has occurred.

Figure 8:
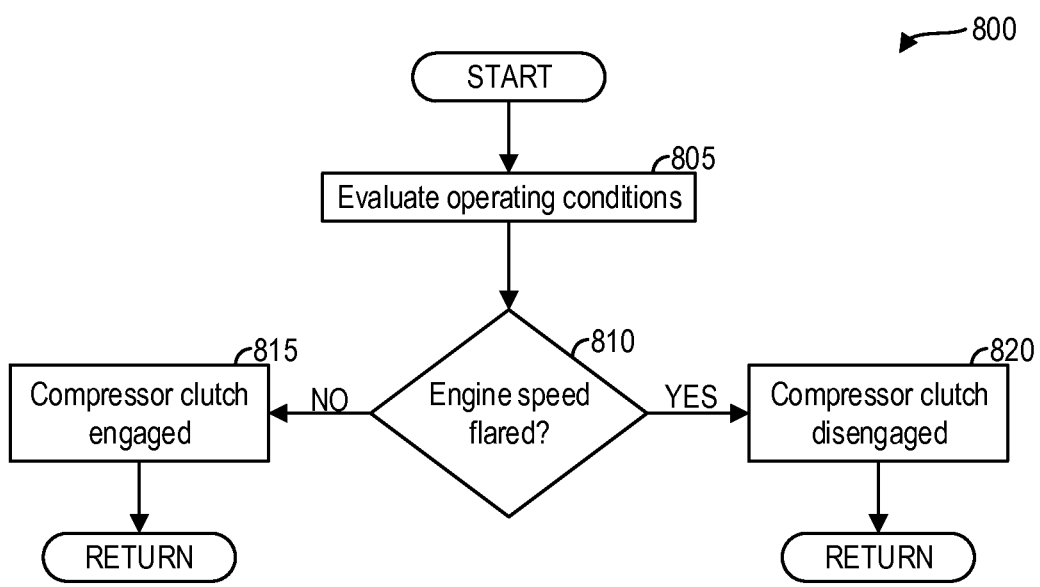
FIG. 8 is a high-level flow chart illustrating an example method for determining disengagement of an air conditioning compressor clutch based on engine speed.

FIG. 8 shows a high-level flow chart illustrating an example method 800 for determining engagement of an AC compressor clutch according to an embodiment of the disclosure. In particular, method 800 relates to determining engagement of an AC compressor clutch based on a flare in engine speed. Flaring of the engine speed while the AC compressor clutch is engaged indicates that the AC compressor clutch has disengaged. This flaring during engagement occurs because the engine load decreases if the AC compressor clutch disengages, and so the engine speed momentarily increases responsive to the decreased load. As a result, method 800 may be carried out while the AC compressor clutch is engaged in order to detect that the AC compressor clutch has disengaged. Method 800 will be described herein with reference to the components and systems of FIGS. 1-2, however it should be understood that the method may be applied to other components and systems without departing from the scope of this disclosure.

Method 800 begins at 805. At 805, method 800 includes evaluating operating conditions. The operating conditions include, but are not limited to, engine speed. Operating conditions may be measured by one or more sensors coupled to the controller, or may be estimated or inferred based on the available data.

At 810, method 800 includes determining if the engine speed flared. A flare in the engine speed comprises a sudden increase in engine speed. Thus, determining if the engine speed flared may comprise sensing an increase in engine speed wherein the rate of change in engine speed is above a threshold rate for a specified time duration. The threshold rate and the specified time duration may be selected to exclude small fluctuations in engine speed. Furthermore, the threshold rate and the specified time duration may additionally or alternatively be selected to exclude flares in engine speed caused by changes in operating conditions other than engagement or disengagement of the compressor clutch.

If the engine speed did not flare ("NO"), then method 800 proceeds to 815. At 815, the method concludes that the compressor clutch is still engaged. The method then returns.

However, if the engine speed flared ("YES"), then method 800 proceeds to 820. At 820, the method concludes that the compressor clutch disengaged. The method then returns.

Thus, engagement of the compressor clutch may be determined based on a flare in engine speed, and a method for determining engagement of the compressor clutch may include determining if such a flare in engine speed has occurred.

Figure 9:
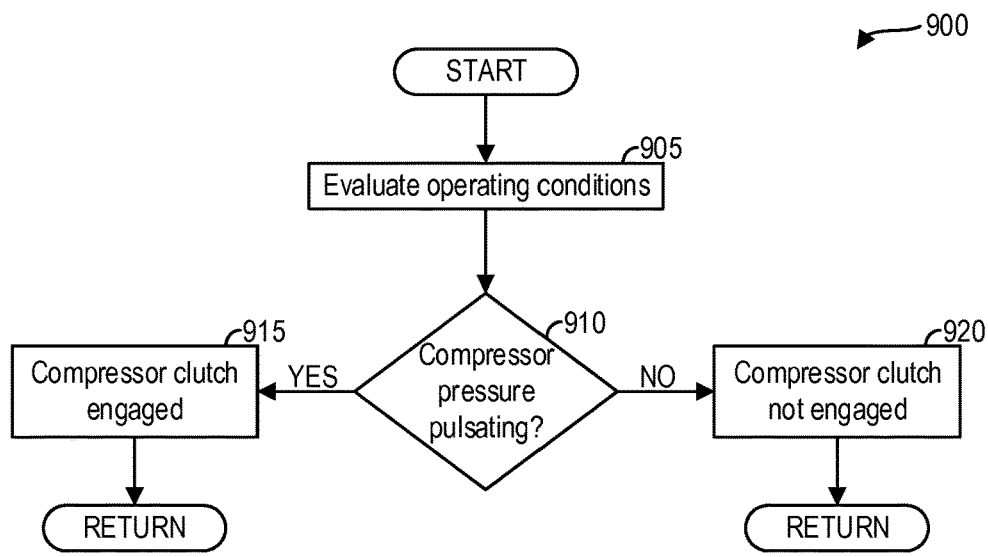
FIG. 9 is a high-level flow chart illustrating an example method for determining engagement of an air conditioning compressor clutch based on compressor pressure.

FIG. 9 shows a high-level flow chart illustrating an example method 900 for determining engagement of an AC compressor clutch according to an embodiment of the disclosure. In particular, method 900 relates to determining engagement of an AC compressor clutch based on sensed compressor pressure. Method 900 will be described herein with reference to the components and systems of FIGS. 1-2, however it should be understood that the method may be applied to other components and systems without departing from the scope of this disclosure.

Method 900 begins at 905. At 905, method 900 includes evaluating operating conditions. Operating conditions include, but are not limited to, AC compressor pressure. Operating conditions may be measured by one or more sensors coupled to the controller, or may be estimated or inferred based on the available data. For example, the AC compressor pressure may be inferred based on other operating conditions, or may be directly sensed via a pressure sensor. For example, the AC compressor pressure may be measured via the pressure sensor 7 depicted in FIG. 1. After evaluating operating conditions, method 900 proceeds to 910.

At 910, method 900 includes determining if the compressor pressure is pulsating. If the compressor pressure is pulsating ("YES"), then method 900 proceeds to 915. At 915, the method concludes that the compressor clutch is engaged. The method then returns.

However, if the compressor pressure is not pulsating at 910 ("NO"), then method 900 proceeds to 920. At 920, the method concludes that the compressor clutch is not engaged. The method then returns.

Thus, engagement of the compressor clutch may be determined based on compressor pressure, and a method for determining engagement of the compressor clutch may include determining if the compressor pressure is pulsating.

Figure 10:
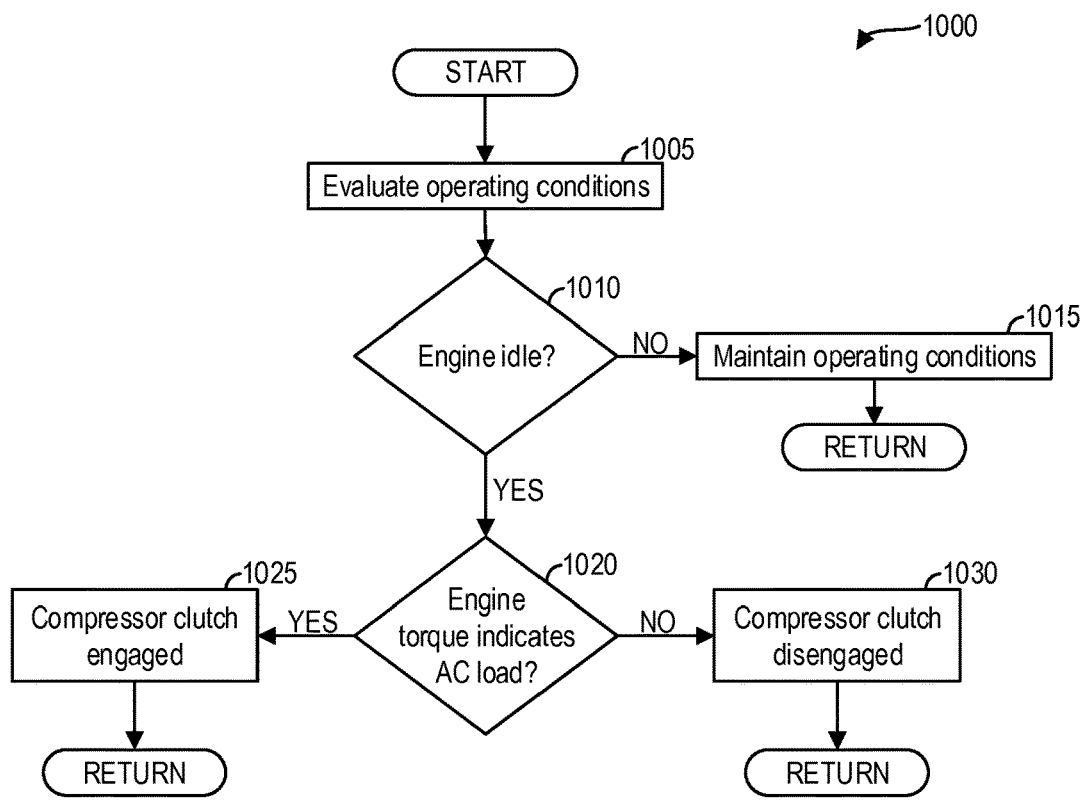
FIG. 10 is a high-level flow chart illustrating an example method for determining engagement of an air conditioning compressor clutch based on engine torque.

FIG. 10 shows a high-level flow chart illustrating an example method 1000 for determining engagement of an AC compressor clutch according to an embodiment of the disclosure. In particular, method 1000 relates to determining engagement of an AC compressor clutch based on engine torque. Method 1000 will be described herein with reference to the components and systems of FIGS. 1-2, however it should be understood that the method may be applied to other components and systems without departing from the scope of this disclosure.

Method 1000 begins at 1005. At 1005, method 1000 includes evaluating operating conditions. Operating conditions include, but are not limited to, engine torque, engine speed, and so on. Operating conditions may be measured by one or more sensors coupled to the controller, or may be estimated or inferred based on the available data. After evaluating the operating conditions, method 1000 proceeds to 1010.

At 1010, method 1000 includes determining if the engine is idle. If the engine is not idle ("NO"), then method 1000 proceeds to 1015. At 1015, method 1000 includes maintaining operating conditions, such as the operating conditions evaluated at 1005. The method then returns.

However, referring again to 1010, if the engine is idle ("YES"), then method 1000 proceeds to 1020. At 1020, method 1000 includes determining if the engine torque indicates an AC load. If the engine torque indicates an AC load ("YES"), then method 1000 proceeds to 1025. At 1025, the method concludes that the compressor clutch is engaged. The method then returns.

However, referring again to 1020, if the engine torque does not indicate an AC load ("NO"), then method 1000 proceeds to 1030. At 1030, the method concludes that the compressor clutch is not engaged. The method then returns.

Thus, engagement of the compressor clutch may be determined based on engine torque, and a method for determining engagement of the compressor clutch may include determining if the engine torque indicates an AC load.

Figure 11:
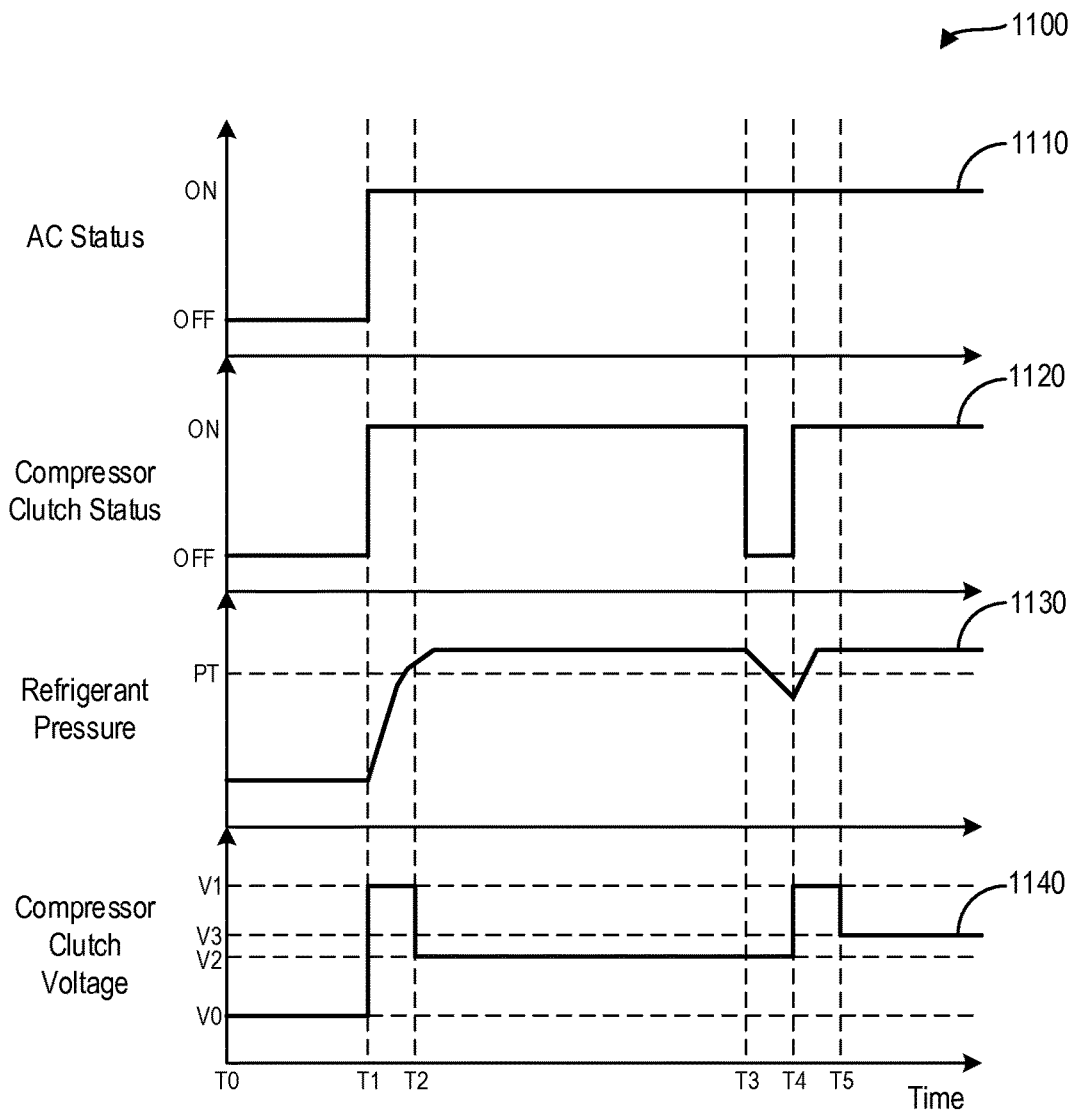
FIG. 11 is a set of graphs illustrating example operating conditions during control of an air conditioning compressor clutch based on refrigerant pressure.

FIG. 11 shows a set of graphs 1100 illustrating example operating conditions during control of an AC compressor clutch according to an embodiment of the invention. In particular, the set of graphs 1100 illustrate example operating conditions when AC compressor clutch control is based on refrigerant pressure. Specifically, the set of graphs 1100 illustrates the controller's reaction to unintended clutch disengagement during the holding phase.

The set of graphs 1100 includes a plot 1110 of AC status over time, a plot 1120 of compressor clutch status over time (this is actual clutch status, not inferred clutch status), a plot 1130 of refrigerant pressure over time, and a plot 1140 of compressor clutch voltage over time. There is some delay between actual clutch status and inferred clutch status. The controller infers clutch status and then takes action based on that.

At time T0, the AC status is off as indicated by plot 1110. Since the air conditioning system is off, it follows that the compressor clutch status is off and the compressor clutch voltage is V0 (i.e., zero volts), as indicated respectively by plots 1120 and 1140. The refrigerant pressure is at an ambient pressure level, as indicated by plot 1130.

At time T1, the AC compression request status is on as indicated by plot 1110. A first compressor clutch voltage V1 is applied to the compressor clutch, as indicated by plot 1140. In some examples, the first compressor clutch voltage V1 may be determined based on operating conditions including but not limited to refrigerant pressure. Responsive to the first compressor clutch voltage V1, the compressor clutch engages (i.e., turns "on"), as indicated by plot 1120. From time T1 to time T2, the refrigerant pressure increases from the ambient pressure to a pressure above a pressure threshold PT, as indicated by plot 1130, while the compressor clutch voltage V1 is applied to the compressor clutch.

The controller monitoring the refrigerant pressure determines that the compressor clutch is engaged based on both the increase in refrigerant pressure and the refrigerant pressure above the pressure threshold PT. Consequently, at time T2, the compressor clutch voltage decreases from the first voltage V1 to a second voltage V2, as indicated by plot 1140. In some examples, the second voltage V2 is determined based on one or more operating conditions, including but not limited to refrigerant pressure.

The second voltage V2 maintains engagement of the compressor clutch. Thus, from times T2 to T3, the compressor clutch status remains on while the holding voltage V2 is applied to the compressor clutch. The refrigerant pressure stabilizes at a maximum value.

Due to changes in operating conditions not shown, at time T3, the compressor clutch disengages. From times T3 to T4, the compressor clutch status switches to off and the refrigerant pressure begins to decrease as a result of the inactive compressor. As the refrigerant pressure decreases and falls below the pressure threshold PT, the controller monitoring the refrigerant pressure determines that the compressor clutch is off. The controller is still applying the compressor clutch voltage V2 to the compressor clutch, as indicated by plot 1140, but the compressor clutch is disengaged.

At time T4, the controller applies the engagement voltage V1 to the compressor clutch, thereby re-engaging the compressor clutch as indicated respectively by plots 1140 and 1120. The refrigerant pressure increases and passes the pressure threshold, thereby indicating to the controller that the controller clutch is engaged.

At time T5, the controller reduces the compressor clutch voltage from the engagement voltage V1 to a new holding voltage V3. Since the original holding voltage V2 proved insufficient for maintaining engagement of the compressor clutch, the new holding voltage V3 is larger than the original holding voltage V2. After time T5, the controller applies the voltage V3 to the compressor clutch and thereby maintains engagement of the compressor clutch.

Figure 12:
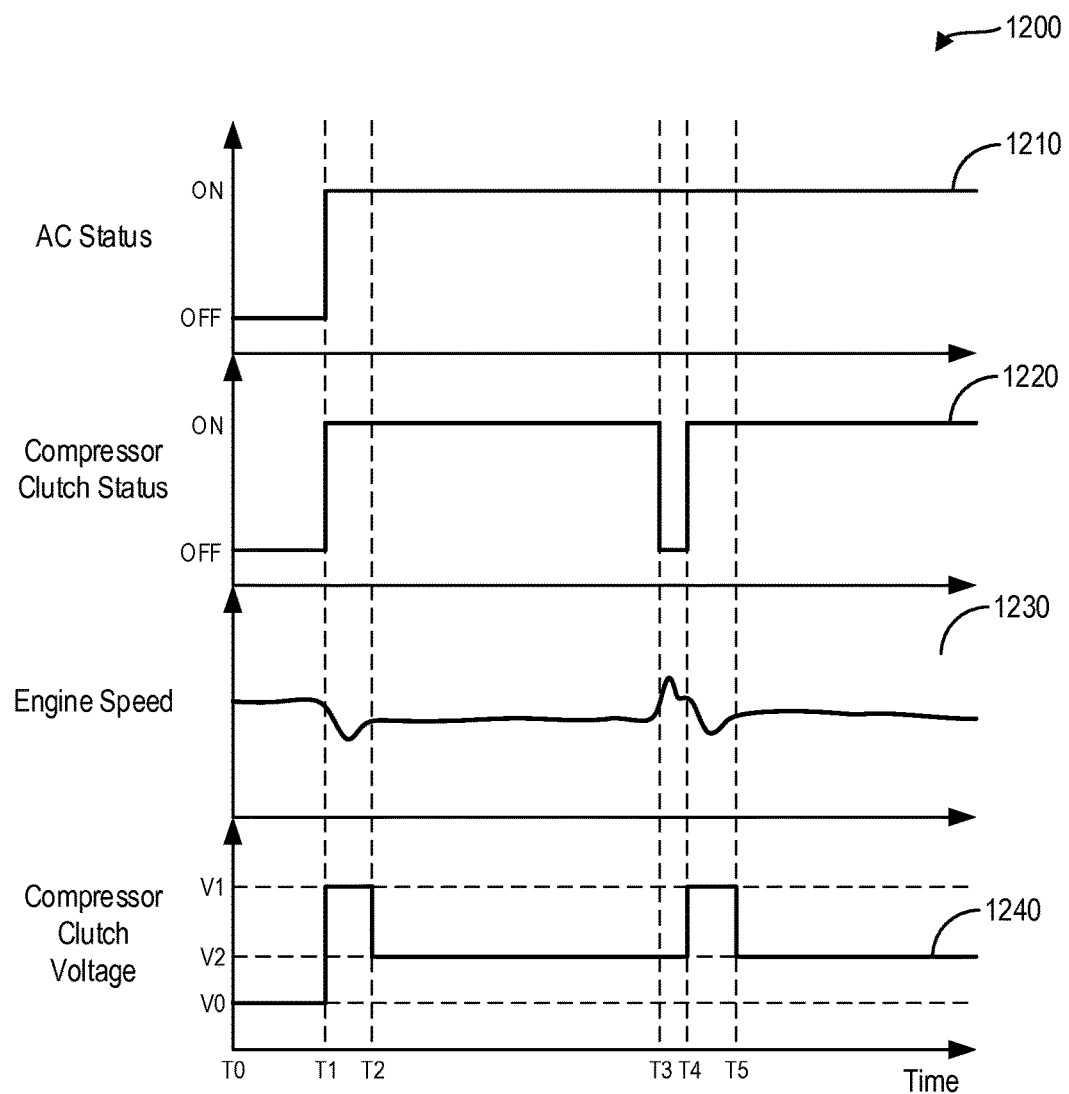
FIG. 12 is a set of graphs illustrating example operating conditions during control of an air conditioning compressor clutch based on engine speed.

FIG. 12 shows a set of graphs 1200 illustrating example operating conditions during control of an AC compressor clutch according to an embodiment of the invention. In particular, the set of graphs 1200 illustrate example operating conditions when AC compressor clutch control is based on engine speed.

The set of graphs 1200 includes a plot 1210 of AC compression request status over time, a plot 1220 of actual (not inferred) compressor clutch status over time, a plot 1230 of engine speed over time, and a plot 1240 of compressor clutch voltage over time.

At time T0, the AC status is off as indicated by plot 1210. Since the air conditioning system is off, it follows that the compressor clutch status is off and the compressor clutch voltage is V0 (i.e., zero volts), as indicated respectively by plots 1220 and 1240. The engine speed is at a slightly varying but relatively steady engine speed, as indicated by plot 1230.

At time T1, the AC status is on as indicated by plot 1210. A first compressor clutch voltage V1 is applied to the compressor clutch, as indicated by plot 1240. In some examples, the first compressor clutch voltage V1 may be determined based on operating conditions including but not limited to engine speed. Responsive to the first compressor clutch voltage V1, the compressor clutch engages (i.e., turns "on"), as indicated by plot 1220. From time T1 to time T2, as torque is transferred from the engine to the compressor via the compressor clutch, the engine speed dips, or decreases, from the ambient engine speed to a lower engine speed, as indicated by plot 1230.

The controller monitoring the engine speed determines that the compressor clutch is engaged based on the dip in engine speed. Consequently, at time T2, the compressor clutch voltage decreases from the first voltage V1 to a second voltage V2, as indicated by plot 1240. In some examples, the second voltage V2 is determined based on one or more operating conditions, including but not limited to engine speed.

The second voltage V2 maintains engagement of the compressor clutch. Thus, from times T2 to T3, the compressor clutch status remains on while the holding voltage V2 is applied to the compressor clutch. The engine speed stabilizes at a value smaller than the engine speed prior to T1, thereby indicating an increased engine load due to the transfer of torque from the engine to the compressor via the compressor clutch.

Due to changes in operating conditions not shown, at time T3, the compressor clutch disengages. From times T3 to T4, the compressor clutch status switches to off and the engine speed flares, or increases, as a result of the disengaged compressor and decreased engine load. As the engine speed flares, the controller monitoring the engine speed determines that the compressor clutch is off. The controller is still applying the compressor clutch voltage V2 to the compressor clutch, as indicated by plot 1240, but the compressor clutch is disengaged.

Responsive to determining that the compressor is off while the AC status remains on, at time T4, the controller applies the engagement voltage V1 to the compressor clutch, thereby re-engaging the compressor clutch as indicated respectively by plots 1240 and 1220. The engine speed dips again from times T4 to T5, thereby indicating to the controller that the controller clutch is engaged.

At time T5, the controller reduces the compressor clutch voltage from the engagement voltage V1 to the holding voltage V2. In some examples, the controller may reduce the compressor clutch voltage from the engagement voltage V1 to a holding voltage different from voltage V2. After time T5, the controller applies the voltage V2 to the compressor clutch and thereby maintains engagement of the compressor clutch.

In this way, power usage of a compressor clutch can be minimized while maintaining engagement of the compressor clutch.

The technical effect of the disclosure may include adjusting a voltage or current flow provided to a compressor clutch based on one or more operating conditions. Another technical effect of the disclosure is the prompt re-engagement of a compressor clutch upon disengagement of the compressor clutch. Yet another technical effect of the disclosure is the reduction in power drawn by a compressor clutch when controlling the compressor clutch.

As one embodiment, a method comprises monitoring a clutch of an air conditioning system in a vehicle when the air conditioning system is activated, and responsive to determining that the clutch is not engaged, increasing a current flow to the clutch.

As one example, determining that the clutch is not engaged is based on the refrigerant pressure. For example, determining that the clutch is not engaged comprises sensing the refrigerant pressure increasing above a pressure threshold.

As another example, determining that the clutch is not engaged is based on the evaporator temperature. For example, determining that the clutch is not engaged comprises sensing the evaporator temperature below a temperature threshold.

As yet another example, monitoring the clutch comprises monitoring engine speed. In such an example, the method further comprises, responsive to a dip in the engine speed, determining that the clutch is initially engaged and reducing current flow to the clutch, and responsive to a flare in the engine speed, determining that the clutch is not engaged and increasing current flow to the clutch.

As another example, monitoring the clutch comprises monitoring compressor pressure. In such an example, determining that the clutch is not engaged is based on the compressor pressure.

As yet another example, monitoring the clutch comprises monitoring engine torque, and determining that the clutch is not engaged is based on the engine torque measured during engine idle.

In another example, the method further comprises decreasing the current flow to the clutch responsive to determining that the clutch is initially engaged.

As another embodiment, a method comprises monitoring refrigerant pressure in an air conditioning system of a vehicle when the air conditioning system is activated, and adjusting voltage applied to a compressor clutch based on the refrigerant pressure.

As an example, adjusting the voltage applied to the compressor clutch comprises increasing the voltage responsive to a decrease in the refrigerant pressure below a pressure threshold while the compressor clutch is activated. In such an example, the method further comprises calculating a first voltage based at least on engine speed, and the voltage is increased to the first voltage.

As another example, adjusting the voltage applied to the compressor clutch comprises decreasing the voltage responsive to an increase in the refrigerant pressure above a pressure threshold while the compressor clutch is activated. In such an example, the method further comprises calculating a second voltage based at least on engine speed, and the voltage is decreased to the second voltage.

As yet another embodiment, a system comprises: an energy conversion device configured to generate torque; a compressor configured to compress refrigerant; and a compressor clutch coupled to the energy conversion device and configured to transfer torque from an energy conversion device to the compressor during engagement of the compressor clutch to the compressor. The system further comprises a controller electrically coupled to the compressor clutch and configured with executable instructions stored in non-transitory memory that when executed cause the controller to: monitor engagement of the compressor clutch; and responsive to disengagement of the compressor clutch when the compressor clutch is commanded to engage, increase a current flow to the compressor clutch.

In one example, the system further comprises a pressure sensor electrically coupled to the controller and configured to measure a pressure of the refrigerant. In such an example, the controller is further configured with executable instructions in the non-transitory memory that when executed cause the controller to determine the disengagement of the compressor clutch based on the pressure of the refrigerant.

In another example, the system further comprises a temperature sensor electrically coupled to the controller and configured to measure temperature of the refrigerant. In such an example, the controller is further configured with executable instructions in the non-transitory memory that when executed cause the controller to determine the disengagement of the compressor clutch based on the temperature of the refrigerant.

In yet another example, the controller is further configured with executable instructions in the non-transitory memory that when executed cause the controller to decrease the current flow to the compressor clutch responsive to initial engagement of the compressor clutch.

In another example, the energy conversion device comprises an engine, and the controller is further configured with executable instructions in the non-transitory memory that when executed cause the controller to determine the disengagement of the compressor clutch based on a speed of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
with an electronic controller of a vehicle, executing instructions stored in non-transitory memory that, when executed, cause the electronic controller to:
activate an air conditioning system in the vehicle by applying a first voltage to a clutch of a compressor of the air conditioning system to initially engage the clutch, and then applying a second voltage to the clutch to maintain the engagement of the clutch, the second voltage lower than the first voltage; while applying the second voltage to the clutch, determine via the electronic controller whether the clutch is still engaged;
responsive to determining that the clutch is still engaged, continue to apply the second voltage to the clutch; and
responsive to determining that the clutch has disengaged, apply the first voltage to the clutch to re-engage the clutch, and then decrease voltage applied to the clutch from the first voltage to a voltage greater than the second voltage to maintain engagement of the clutch.

2. The method of claim 1, wherein determining via the electronic controller whether the clutch is still engaged is based on a refrigerant pressure.

3. The method of claim 2, wherein determining that the clutch has disengaged comprises sensing the refrigerant pressure increasing above a pressure threshold.

4. The method of claim 1, wherein the determining via the electronic controller whether the clutch is still engaged is based on an evaporator temperature.

5. The method of claim 4, wherein determining that the clutch has disengaged comprises sensing the evaporator temperature below a temperature threshold.

6. The method of claim 1, wherein determining via the electronic controller whether the clutch is still engaged comprises monitoring an engine speed.

7. The method of claim 6, further comprising:
responsive to a dip in the engine speed, determining that the clutch is initially engaged and reducing a current flow to the clutch; and
responsive to a flare in the engine speed, determining that the clutch is not engaged and increasing the current flow to the clutch.

8. The method of claim 1, further comprising monitoring a compressor pressure, wherein determining via the electronic controller whether the clutch is still engaged is based on the compressor pressure.

9. The method of claim 1, wherein the instructions further comprise instructions that, when executed, cause the electronic controller to measure engine torque during engine idle via one or more sensors, and wherein determining via the electronic controller whether the clutch is still engaged is based on the measured engine torque.

10. A method for a vehicle, comprising:
with an electronic controller, executing instructions stored in non-transitory memory that, when executed, cause the controller to:
activate an engine-driven air conditioning system in the vehicle, including applying a first voltage to a clutch of a compressor of the engine-driven air conditioning system to initially engage the clutch;
determine a second voltage to apply to the clutch to maintain engagement of the clutch based on at least one operating condition, wherein the second voltage is lower than the first voltage;
apply the second voltage to the clutch;
while applying the second voltage to the clutch, operate the vehicle with an engine at idle, measure engine torque via one or more sensors, and determine whether the clutch is still engaged based on the measured engine torque;
responsive to determining that the clutch is still engaged, continue to apply the second voltage to the clutch; and responsive to determining that the clutch has disengaged, apply the first voltage to the clutch to re-engage the clutch, and then decrease voltage applied to the clutch from the first voltage to the second voltage to maintain engagement of the clutch.

11. The method of claim 10, wherein the first voltage is a clutch engagement voltage which, when applied to the clutch in an un-engaged state, energizes the clutch such that the clutch engages.

12. The method of claim 10, wherein the instructions further comprise instructions that, when executed, cause the controller to determine the first voltage based on a coil temperature of the clutch, and wherein the first voltage is a minimum voltage capable of engaging the clutch based on instantaneous operating conditions.

13. The method of claim 10, wherein the at least one operating condition on which the determination of the second voltage is based comprises a coil temperature of the clutch.

14. The method of claim 13, wherein the second voltage, when determined at a first coil temperature, is greater than the second voltage when determined at a second coil temperature, which is lower than the first coil temperature.

15. The method of claim 10, wherein the at least one operating condition on which the determination of the second voltage is based comprises a torque requirement of the compressor.

16. The method of claim 10, wherein the first voltage and the second voltage are reset at each vehicle key-up cycle.

* * * * *